(12) United States Patent
Hao et al.

(10) Patent No.: US 10,237,174 B2
(45) Date of Patent: Mar. 19, 2019

(54) METHOD FOR ESTABLISHING HARD PIPE IN NETWORK, AND METHOD AND APPARATUS FOR FORWARDING PACKET IN NETWORK

(71) Applicant: Huawei Technologies Co., LTD., Shenzhen (CN)

(72) Inventors: Jiangtao Hao, Beijing (CN); He Huang, Beijing (CN); Wenwu Zhang, Beijing (CN); Guanfeng Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 15/379,932

(22) Filed: Dec. 15, 2016

(65) Prior Publication Data

US 2017/0099216 A1 Apr. 6, 2017

Related U.S. Application Data

(63) Continuation of application No. PCT/CN2015/077387, filed on Apr. 24, 2015.

(30) Foreign Application Priority Data

Jun. 16, 2014 (CN) .......................... 2014 1 0268426
Sep. 15, 2014 (CN) .......................... 2014 1 0468670

(51) Int. Cl.
*H04L 12/723* (2013.01)
*H04L 12/713* (2013.01)
(Continued)

(52) U.S. Cl.
CPC ........ *H04L 45/507* (2013.01); *H04L 12/4633* (2013.01); *H04L 12/4641* (2013.01);
(Continued)

(58) Field of Classification Search
CPC . H04L 45/507; H04L 45/586; H04L 12/4633; H04L 12/4641; H04L 69/22
See application file for complete search history.

(56) References Cited

U.S. PATENT DOCUMENTS 6,038,230 A * 3/2000 Ofek .................. H04L 12/6418
370/389
6,778,496 B1 * 8/2004 Meempat ............ H04L 45/123
370/230

(Continued)

FOREIGN PATENT DOCUMENTS

CN 1902856 A 1/2007
CN 101232460 A 7/2008
(Continued)

OTHER PUBLICATIONS

C37.94 IEEE Standard for N Times 64 Kilobit Per Second Optical Fiber Interfaces Between Teleprotection and Multiplexer Equipment, IEEE Power Engineering Society, Sponsored by the Power System Relaying Committee and Power System Communications Committee, Mar. 31, 2003, IEEE Std C37.94™-2002, 19 pages.

(Continued)

*Primary Examiner* — Rasheed Gidado
(74) *Attorney, Agent, or Firm* — Fish & Richardson P.C.

(57) ABSTRACT

The present disclosure discloses a method and apparatus for establishing a hard pipe in a network. The network includes multiple routers and a network management system. The method includes: acquiring, by the network management system, bandwidths of a plurality of links in the network; instructing, a router to allocate a fixed bandwidth from a bandwidth of the link of the network topology, where a link to which the fixed bandwidth is allocated forms a sublink, and the sublink and the router that allocates the sublink form a hard pipe stratum, which is used to carry a leased line service; and allocating, a static MPLS label set to the hard pipe stratum. A service packet that has an MPLS label in the static MPLS label set is forwarded by using the hard pipe stratum, thereby ensuring that a bandwidth of the leased line service is not occupied by a non-leased line service.

10 Claims, 8 Drawing Sheets

(51) Int. Cl.
  *H04L 29/06* (2006.01)
  *H04L 12/46* (2006.01)
  *H04L 12/911* (2013.01)
  *H04L 12/24* (2006.01)

(52) U.S. Cl.
  CPC .............. *H04L 41/00* (2013.01); *H04L 45/50* (2013.01); *H04L 45/586* (2013.01); *H04L 47/781* (2013.01); *H04L 47/825* (2013.01); *H04L 69/22* (2013.01)

(56) References Cited

U.S. PATENT DOCUMENTS

| | | | |
|---|---|---|---|
| 7,283,477 B1* | 10/2007 | Fedyk | ............... H04L 45/02 370/237 |
| 7,561,580 B1* | 7/2009 | Johri | ............... H04L 41/0806 370/395.5 |
| 7,804,767 B1 | 9/2010 | Owens et al. | |
| 7,903,553 B2* | 3/2011 | Liu | ............... H04L 47/10 370/230.1 |
| 7,948,986 B1 | 5/2011 | Ghosh et al. | |
| 8,121,126 B1 | 2/2012 | Moisand et al. | |
| 8,374,095 B2 | 2/2013 | Boutros et al. | |
| 8,451,846 B1 | 5/2013 | Ayyangar | |
| 8,537,839 B2* | 9/2013 | Gintis | ............... H04L 43/50 370/218 |
| 2003/0137971 A1* | 7/2003 | Gibson | ............... H04L 45/50 370/351 |
| 2004/0004955 A1* | 1/2004 | Lewis | ............... H04L 12/4633 370/351 |
| 2004/0028054 A1 | 2/2004 | Khurana et al. | |
| 2005/0117512 A1 | 6/2005 | Vasseur et al. | |
| 2005/0259586 A1 | 11/2005 | Hafid et al. | |
| 2010/0214913 A1 | 8/2010 | Kompella | |
| 2010/0238788 A1 | 9/2010 | Boutros et al. | |
| 2012/0207012 A1 | 8/2012 | Kompella | |
| 2014/0219135 A1* | 8/2014 | Li | ............... H04L 12/4641 370/254 |

FOREIGN PATENT DOCUMENTS

| | | |
|---|---|---|
| CN | 101753249 A | 6/2010 |
| CN | 101815035 A | 8/2010 |
| CN | 104038443 A | 9/2014 |
| CN | 104219098 A | 12/2014 |
| WO | 2011076495 A1 | 6/2011 |
| WO | 2013011420 A1 | 1/2013 |

OTHER PUBLICATIONS

ITU-T G.703 Amendment 1 Series G: Transmission Systems and Media, Digital Systems and Networks Digital terminal equipments—General Physical/electrical characteristics of hierarchical digital interfaces Amendment 1—Specifications for the physical layer of the new ITU-T G.8271/Y.1366 time synchronization interfaces, Telecommunication Standardization Sector of ITU, Aug. 2013, 10 pages.
IEEE Standard for a Precision Clock Synchronization Protocol for Networked Measurement and Control Systems, IEEE Instrumentation and Measurement Society, Sponsored by the Technical Committee on Sensor Technology (TC-9), IEEE Std 1588™-2008, Jul. 24, 2008, 289 pages.
S. Bradner et al: "Benchmarking Methodology for Network Interconnect Devices", Network Working Group, rfc2544, Category: Informational, Mar. 1999, 25 pages.
ITU-T G.8013/Y.1731 Series G: Transmission Systems and Media, Digital Systems and Networks Packet over Transport aspects—Ethernet over Transport aspects Series Y: Global Information Infrastructure, Internet Protocol Aspects and Next-Generation Networks Internet protocol aspects—Operation, administration and maintenance, OAM functions and mechanisms for Ethernet based networks, Telecommunication Standardization Sector of ITU, Nov. 2013, 99 pages.
ITU-T Y.1564 Series Y: Global Information Infrastructure, Internet Protocol Aspects and Next-Generation Networks Internet protocol aspects—Quality of service and network performance Ethernet service activation test methodology, Telecommunication Standardization Sector of ITU, Mar. 2011, 38 pages.
International Search Report issued in International Application No. PCT/CN2015/077387, dated Jul. 30, 2015, 4 pages.
Supplemental Partial European Search Report issued in European Application No. 15809049, dated Mar. 22, 2017, 6 pages.
Office Action issued in Chinese Application No. 201410468670.6, dated Mar. 27, 2017, 3 pages.
Search Report issued in Chinese Application No. 201410468670.6, dated Mar. 6, 2017, 2 pages.

* cited by examiner

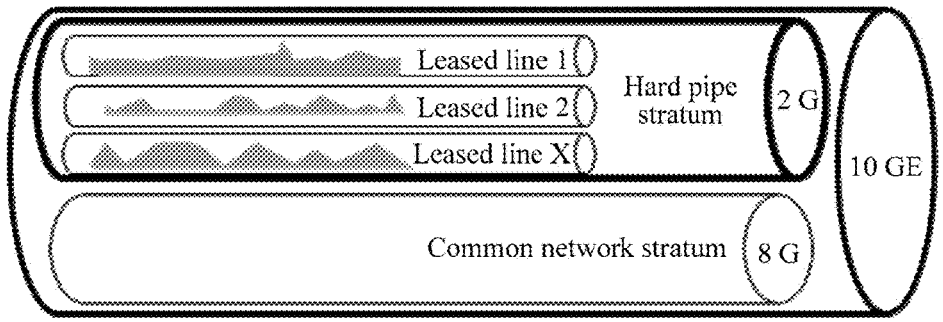

FIG. 4A

```
A first router receives a label forwarding entry delivered by
a network management system, where the label forwarding       S501
entry includes a static MPLS label, and the label
forwarding entry is used to establish a hard pipe from the
first router to a second router
```

```
The first router receives a service packet of a leased line
service that is sent by a user, and encapsulates, before a    S502
header of the service packet, the static MPLS label and a
leased line label that corresponds to the leased line service
```

```
The first router sends, according to the forwarding entry,
the service packet in which the static MPLS label and the     S503
leased line label are encapsulated to the second router by
using the hard pipe
```

FIG. 5

METHOD FOR ESTABLISHING HARD PIPE IN NETWORK, AND METHOD AND APPARATUS FOR FORWARDING PACKET IN NETWORK

CROSS-REFERENCE TO RELATED APPLICATIONS

This application is a continuation of International Application No. PCT/CN2015/077387, filed on Apr. 24, 2015, which claims priority to Chinese Patent Application No. 201410268426.5, filed on Jun. 16, 2014 and Chinese Patent Application No. 201410468670.6, filed on Sep. 15, 2014. All of the aforementioned patent applications are hereby incorporated by reference in their entireties.

TECHNICAL FIELD

The present disclosure relates to the communications field, and in particular, to a method for establishing a hard pipe in a network, and a method and an apparatus for forwarding a packet in a network.

BACKGROUND

Currently, in a network, network provider mainly provides two types of services: a leased line (Leased Line) service and a common broadband service. These two types of services share network bandwidths.

To ensure bandwidths for all services in the network, especially a bandwidth for a leased line service, the network provider set a total bandwidth in the network to be much greater than a sum of the bandwidths of all the services in the network. Such a manner of setting a bandwidth is generally referred to as a large bandwidth manner.

The large bandwidth manner has the following disadvantages: Although a total network bandwidth is set relatively large, the leased line service and another service still share the network bandwidth. Therefore, the bandwidth of the leased line service is often occupied by the another service, resulting in that the bandwidth of the leased line service is unstable, and ensuring a stable bandwidth cannot be achieved for the leased line service as expected.

SUMMARY

To resolve the foregoing technical problem, the present disclosure provides a method for establishing a hard pipe in a network, and a method and an apparatus for forwarding a packet in a network, to separately allocate a hard pipe stratum to a leased line service in the network, to ensure that a bandwidth of the leased line service is not occupied by another service.

Embodiments of the present disclosure disclose the following technical solutions:

According to a first aspect, the present disclosure provides a method for establishing a hard pipe stratum in a network, where the network includes multiple routers and a network management system, adjacent routers of the multiple routers are connected to each other by using a link that has a particular bandwidth, the multiple routers form a network topology by using the link, and the method includes:

acquiring, by the network management system, bandwidths of all links in the network;

instructing, by the network management system, a router in the network topology to allocate a fixed bandwidth from a bandwidth of the link of the network topology, where a link to which the fixed bandwidth is allocated forms a sublink, and the sublink and the router that allocates the sublink form a hard pipe stratum, where the hard pipe stratum is a subtopology of the network topology, and the hard pipe stratum is used to carry a leased line service; and allocating, by the network management system, a static Multiprotocol Label Switching (MPLS) label set to the hard pipe stratum, where the static MPLS label set is used to forward, in the hard pipe stratum, the leased line service.

In a first possible implementation manner of the first aspect, when the network management system forwards, in the hard pipe stratum, the leased line service from a first router to a second router, the first router is a router in the hard pipe stratum, the second router is a router in the hard pipe stratum, and the method includes:

determining, by the network management system, in the hard pipe stratum, a path from the first router to the second router;

allocating, by the network management system, from the static MPLS label set, a corresponding static MPLS label to each router on the path, and generating a label forwarding entry corresponding to each router; and separately delivering, by the network management system, the corresponding label forwarding entry to each router, so as to establish, in the hard pipe stratum, a hard pipe from the first router to the second router, where the hard pipe is a Label Switched Path (LSP) or a Pseudo wire (PW) in the hard pipe stratum.

With reference to the first possible implementation manner of the first aspect, in a second possible implementation manner, a fixed leased line bandwidth of the leased line service is less than or equal to a minimum value of a bandwidth of the sublink in the hard pipe.

With reference to the first aspect or any of the foregoing possible implementation manners of the first aspect, in a third possible implementation manner, the leased line service is a Virtual Private Network (VPN) service, and a VPN label corresponding to the VPN service is a static label allocated by the network management system, or a VPN label corresponding to the VPN service is dynamically allocated by using a dynamic protocol.

According to a second aspect, the present disclosure provides a network management system for establishing a hard pipe stratum in a network, where the network includes multiple routers and the network management system, adjacent routers of the multiple routers are connected to each other by using a link that has a particular bandwidth, the multiple routers form a network topology by using the link, and the network management system includes:

an acquiring unit, configured to acquire bandwidths of all links in the network;

a generation unit, configured to instruct a router in the network topology to allocate a fixed bandwidth from a bandwidth of the link of the network topology, where a link to which the fixed bandwidth is allocated forms a sublink, and the sublink and the router that allocates the sublink form a hard pipe stratum, where the hard pipe stratum is a subtopology of the network topology, and the hard pipe stratum is used to carry a leased line service; and an allocation unit, configured to allocate a static multiprotocol label switching MPLS label set to the hard pipe stratum, where the static MPLS label set is used to forward, in the hard pipe stratum, the leased line service.

In a first possible implementation manner of the second aspect, when the network management system forwards, in the hard pipe stratum, the leased line service from a first router to a second router, the first router is a router in the hard pipe stratum, the second router is a router in the hard pipe stratum, and the network management system further includes:

a path determining unit, configured to determine, in the hard pipe stratum, a path from the first router to the second router;

a generation unit, configured to allocate, from the static MPLS label set, a corresponding static MPLS label to each router on the path, and generate a label forwarding entry corresponding to each router; and a sending unit, configured to separately deliver the corresponding label forwarding entry to each router, so as to establish, in the hard pipe stratum, a hard pipe from the first router to the second router, where the hard pipe is a label switched path LSP or a pseudo wire PW in the hard pipe stratum.

With reference to the first possible implementation manner of the second aspect, in a second possible implementation manner, the leased line service is a VPN service, a leased line label is a VPN label corresponding to the VPN service, and the VPN label is a static label allocated by the network management system, or the VPN label is dynamically allocated by using a dynamic protocol.

According to a third aspect, the present disclosure provides a method for forwarding a packet in a network, where the network includes a first router, a second router, and a network management system, and the method includes:

receiving, by the first router, a label forwarding entry delivered by the network management system, where the label forwarding entry includes a static multiprotocol label switching MPLS label, the label forwarding entry is used to establish a hard pipe from the first router to the second router, and the hard pipe is a label switched path LSP or a pseudo wire PW from the first router to the second router;

receiving, by the first router, a service packet of a leased line service that is sent by a user, and encapsulating, before a header of the service packet, the static MPLS label and a leased line label that corresponds to the leased line service; and sending, by the first router according to the forwarding entry, the service packet in which the static MPLS label and the leased line label are encapsulated to the second router by using the hard pipe.

In a first possible implementation manner of the third aspect, the leased line service is a virtual private network VPN service, the leased line label is a VPN label corresponding to the VPN service, and the VPN label is a static label allocated by the network management system, or the VPN label is dynamically allocated by using a dynamic protocol.

According to a fourth aspect, the present disclosure provides a first router for forwarding a packet in a network, where the network includes the first router, a second router, and a network management system, where the first router includes:

a sending unit, configured to receive a label forwarding entry delivered by the network management system, where the label forwarding entry includes a static multiprotocol label switching MPLS label, the label forwarding entry is used to establish a hard pipe from the first router to the second router, and the hard pipe is a label switched path LSP or a pseudo wire PW from the first router to the second router; and a receiving unit, configured to receive a service packet of a leased line service that is sent by a user, and encapsulate, before a header of the service packet, the static MPLS label and a leased line label that corresponds to the leased line service, where the sending unit is configured to send, according to the forwarding entry, the service packet in which the static MPLS label and the leased line label are encapsulated to the second router by using the hard pipe.

In a first possible implementation manner of the fourth aspect, the leased line service is a VPN service, a VPN label corresponding to the VPN service is a static label allocated by the network management system, or the VPN label is dynamically allocated by using a dynamic protocol.

According to a fifth aspect, the present disclosure provides a method for establishing a hard pipe in a network, where the network includes multiple routers and a network management system, adjacent routers of the multiple routers are connected to each other by using a link that has a particular bandwidth, and the method includes:

acquiring, by the network management system, bandwidths of all links between a first router and a second router, where the first router is one router of the multiple routers, and the second router is one router of the multiple routers;

determining, by the network management system, a static multiprotocol label switching MPLS label set;

determining, by the network management system, in the network, a path from the first router to the second router;

allocating, by the network management system, from the static MPLS label set, a corresponding static MPLS label to each router on the path, and generating a label forwarding entry corresponding to each router;

separately delivering, by the network management system, the corresponding label forwarding entry to each router, to instruct all routers on the path to allocate a fixed bandwidth from a bandwidth of a link on the path, where the link to which the fixed bandwidth is allocated forms a sublink; and establishing, by the network management system, on the path, a hard pipe from the first router to the second router by using the sublink and the router that allocates the sublink, where the hard pipe is a label switched path LSP or a pseudo wire PW in the network.

In a first possible implementation manner of the fifth aspect, a fixed leased line bandwidth of a leased line service carried by the hard pipe is less than or equal to a bandwidth of the sublink in the hard pipe.

With reference to the first possible implementation manner of the fifth aspect, in a second possible implementation manner, the leased line service is a VPN service, a leased line label is a VPN label corresponding to the VPN service, and the VPN label is a static label allocated by the network management system, or the VPN label is dynamically allocated by using a dynamic protocol.

According to a sixth aspect, the present disclosure provides a network management system for establishing a hard pipe in a network, where the network includes multiple routers and the network management system, adjacent routers of the multiple routers are connected to each other by using a link that has a particular bandwidth, and the network management system includes:

an acquiring unit, configured to acquire bandwidths of all links between a first router and a second router, where the first router is one router of the multiple routers, and the second router is one router of the multiple routers;

a determining unit, configured to determine a static multiprotocol label switching MPLS label set;

a path determining unit, configured to determine, in the network, a path from the first router to the second router;

a generation unit, configured to allocate, from the static MPLS label set, a corresponding static MPLS label to each router on the path, and generate a label forwarding entry corresponding to each router;

a sending unit, configured to separately deliver the corresponding label forwarding entry to each router, to instruct all routers on the path to allocate a fixed bandwidth from a bandwidth of a link on the path, where the link to which the fixed bandwidth is allocated forms a sublink; and a hard pipe establishing unit, configured to establish, on the path, a hard pipe from the first router to the second router by using the sublink and the router that allocates the sublink, where the hard pipe is a label switched path LSP or a pseudo wire PW in the network.

In a first possible implementation manner of the sixth aspect, a fixed leased line bandwidth of a leased line service carried by the hard pipe is less than or equal to a bandwidth of the sublink in the hard pipe.

With reference to the first possible implementation manner of the sixth aspect, in a second possible implementation manner, the leased line service is a VPN service, a leased line label is a VPN label corresponding to the VPN service, and the VPN label is a static label allocated by the network management system, or the VPN label is dynamically allocated by using a dynamic protocol.

It can be seen from the foregoing technical solutions that a network management system instructs a router in a network topology to allocate a fixed bandwidth on a link connected to the router, a sublink formed by a link to which the fixed bandwidth is allocated and the router that allocates the sublink form a hard pipe stratum of the network, and a static MPLS label set is allocated to the hard pipe stratum, so that only a service packet that has an MPLS label in the static MPLS label set is forwarded by using the hard pipe stratum. A label in the static MPLS label set is allocated to a service packet of only a leased line service, so that the hard pipe stratum carries only the leased line service, and forwards a service packet of only the leased line service, thereby ensuring that a bandwidth of the leased line service is not occupied by a non-leased line service, and providing a leased line service whose bandwidth is ensured.

BRIEF DESCRIPTION OF DRAWINGS

To describe the technical solutions in some embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 4A is a schematic diagram of network bandwidth allocation according to an embodiment of the present disclosure;

FIG. 5 is a flowchart of a method for forwarding a packet in a network according to an embodiment of the present disclosure;

DESCRIPTION OF EMBODIMENTS

Figure 1:
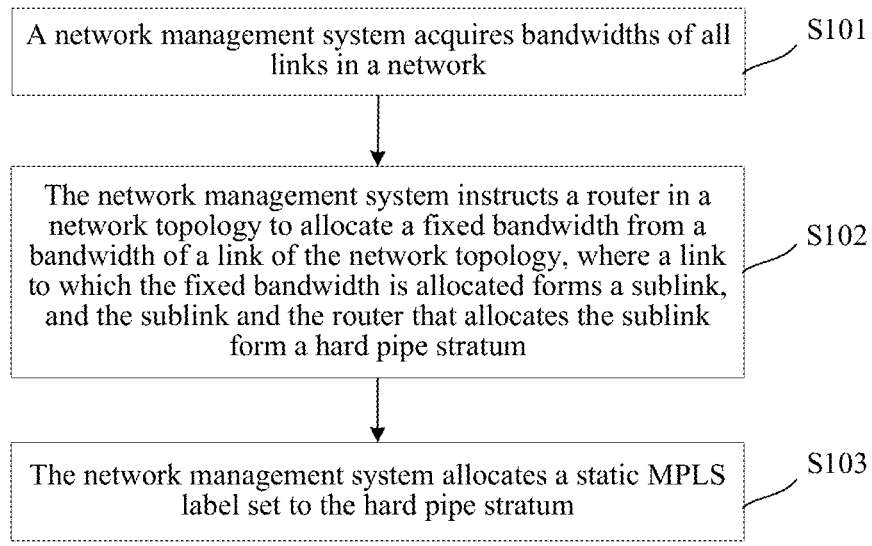
FIG. 1 is a flowchart of a method for establishing a hard pipe stratum in a network according to an embodiment of the present disclosure.

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It can be seen from the prior art that currently in a network, especially in a Multiprotocol Label Switching (MPLS) network, there is no effective manner that can ensure that a bandwidth of an end-to-end leased line service is not occupied by another service, and dedicated and stable functions that should be achieved for the leased line service cannot be achieved. As a result, a user that currently leases a leased line service still tends to choose a Time Division Multiplexing (TDM) leased line of an obsolete Synchronous Digital Hierarchy (SDH) network, resulting in that providers still cannot decommission the SDH network, which greatly increases operating costs of the providers. Currently, to run a leased line service in the network, in the generally used large bandwidth manner, the leased line service and a common service still share a large bandwidth, which still cannot resolve an issue of separately ensuring a bandwidth for the leased line service. As a result, the bandwidth of the leased line service is often occupied by another service that is common, and particularly, during peak hours when users access the Internet, the leased line service is severely affected. Therefore, a network management system provided in the embodiments of the present disclosure instructs a router in a network topology to allocate a fixed bandwidth on a link connected to the router, a sublink formed by a link to which the fixed bandwidth is allocated and the router that allocates the sublink form a hard pipe stratum of the network, and a static MPLS label set is allocated to the hard pipe stratum, so that only a service packet that has an MPLS label in the static MPLS label set is forwarded by using the hard pipe stratum. A label in the static MPLS label set is allocated to a service packet of only a leased line service, so that the hard pipe stratum carries only the leased line service, and forwards a service packet of only the leased line service, thereby ensuring that a bandwidth of the leased line service is not occupied by a non-leased line service, and providing a leased line service whose bandwidth is ensured.

In a backbone network, when a packet of a user is being forwarded, a network access router of the user encapsulates, before a service packet of a leased line service, an MPLS label of a static MPLS label set allocated to a hard pipe stratum, and forwards the service packet of the leased line service by using a hard pipe in the hard pipe stratum, where the access router may be a Provider Edge (PE) router. A service packet of a non-leased line service is encapsulated by using a label that does not belong to the static MPLS label set, and forwarded by using a bandwidth that does not belong to the hard pipe stratum in the network. Therefore, the hard pipe stratum is used to forward a service packet of only the leased line service, and the leased line service and a common service do not share a bandwidth, thereby separating a bandwidth of the leased line service from a bandwidth of the common service. Even if situations of congestion and packet loss occur in the common service during peak hours of network use, a service packet of the common service is not forwarded by using the hard pipe stratum, so that the bandwidth ensured for the leased line service is not occupied.

To make the foregoing objectives, features, and advantages of the present disclosure clearer and more comprehensible, the following describes the embodiments of the present disclosure in detail with reference to the accompanying drawings.

Embodiment 1

Referring to FIG. 1, FIG. 1 is a flowchart of a method for establishing a hard pipe stratum in a network according to an embodiment of the present disclosure. The network includes multiple routers and a network management system, adjacent routers of the multiple routers are connected to each other by using a link that has a particular bandwidth, and the multiple routers form a network topology by using the link. This embodiment describes, from a side of the network management system in the network, how to establish a hard pipe stratum in the network.

As shown in FIG. 1, the method includes:

S101: The network management system acquires bandwidths of all links in the network.

S102: The network management system instructs a router in the network topology to allocate a fixed bandwidth from a bandwidth of the link of the network topology, where a link to which the fixed bandwidth is allocated forms a sublink, and the sublink and the router that allocates the sublink form a hard pipe stratum, where the hard pipe stratum is a subtopology of the network topology, and the hard pipe stratum is used to carry a leased line service.

For S101, it should be noted that before instructing the router to allocate the fixed bandwidth from the bandwidth of the link, the network management system first needs to know the bandwidths of all the links in the network. For a link, an allocated fixed bandwidth is less than or equal to an actual bandwidth of the link.

For S102, it should be noted that this step is not to limit that a fixed bandwidth should be allocated from the bandwidths of all the links in the network. A fixed bandwidth may be allocated from a bandwidth of a selected corresponding link according to an actual operating requirement of the network. In addition, according to an actual requirement of the leased line service, for different links, allocated fixed bandwidths may be different. For example, in the network, for a bandwidth of 10 G of a link between adjacent routers A and B, a fixed bandwidth of 2 G may be allocated. For a bandwidth of 10 G of a link between adjacent routers A and C, a requirement of the leased line service is relatively large, and a fixed bandwidth of 4 G may be allocated. For the routers A and B, the allocated fixed bandwidth of 2 G forms a sublink of the link between the routers A and B. For the routers A and C, the allocated fixed bandwidth of 4 G forms a sublink of the link between the routers A and C.

S103: The network management system allocates a static MPLS label set to the hard pipe stratum, where the static MPLS label set is used to forward, in the hard pipe stratum, the leased line service.

That is, an MPLS label in the static MPLS label set is specially used for the leased line service. Even if the network is a dynamic network, when a case such as a change in the network topology causes reallocation of an MPLS label, the MPLS label in the static MPLS label set does not change for this.

The following describes establishment of a hard pipe stratum in a network in a manner of a schematic diagram of a network topology.

Figure 2A:
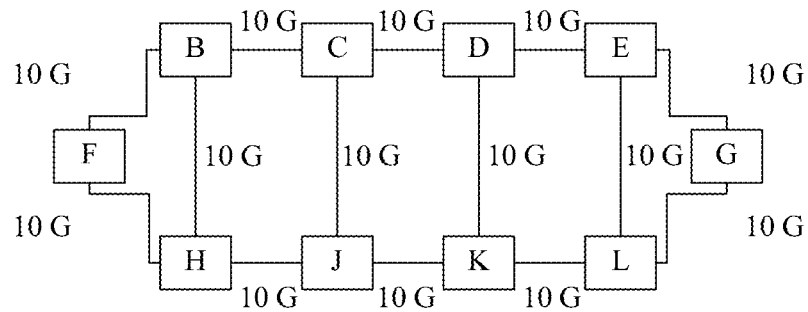
FIG. 2a is a schematic structural diagram of a network topology according to an embodiment of the present disclosure.

FIG. 2a is a schematic structural diagram of a network topology according to an embodiment of the present disclosure. As shown in FIG. 2a, the network includes 10 routers and a network management system (not shown). The 10 routers are separately a router B, a router C, a router D, a router E, a router F, a router G, a router H, a router J, a router K, and a router L, and a link bandwidth of each link in the network is 10 G.

Figure 2B:
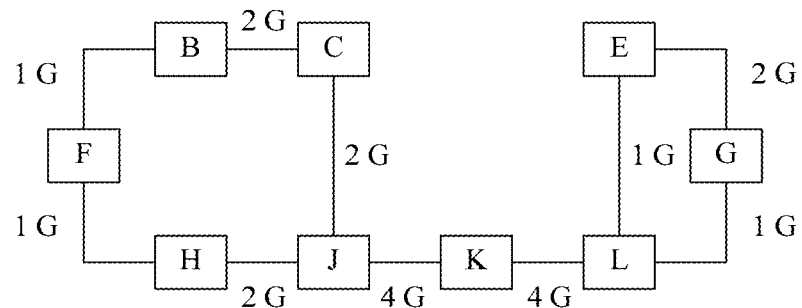
FIG. 2b is a schematic diagram of a network topology of a hard pipe stratum according to an embodiment of the present disclosure.

FIG. 2b is a schematic diagram of a network topology of a hard pipe stratum according to an embodiment of the present disclosure. After acquiring bandwidths of all links, the network management system establishes, according to a current network service requirement, a hard pipe stratum (Hard Pipe Stratum) used to carry a leased line service. As shown in FIG. 2b, the network management system instructs routers B, C, E, F, G, H, J, K, and L in the network topology to allocate a fixed bandwidth from a bandwidth of the link of the network topology, a link to which the fixed bandwidth is allocated forms a sublink, and the sublink and the router that allocates the sublink form a hard pipe stratum. 1 G, 2 G, and 4 G shown in FIG. 2b are fixed bandwidths allocated from corresponding bandwidths of links, that is, bandwidths that form sublinks of the hard pipe stratum. The network topology shown in FIG. 2b is a subtopology of the network topology shown in FIG. 2a.

Figure 2C:
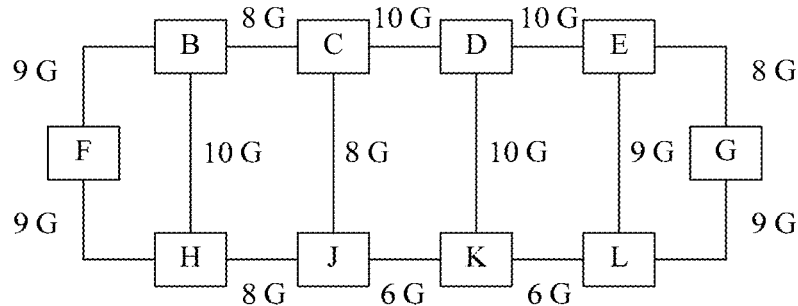
FIG. 2c is a schematic diagram of a network topology of a common network stratum according to an embodiment of the present disclosure.

FIG. 2c is a schematic diagram of a network topology of a common network stratum according to an embodiment of the present disclosure. It should be noted herein that after the network management system establishes the hard pipe stratum in the network, a sublink formed by a remaining bandwidth of a link for which a fixed bandwidth is allocated, a link for which no bandwidth is allocated, the router that allocates the sublink, and a router that allocates no fixed bandwidth also form a logical network or a stratum that carries a common service. In contrast to the hard pipe stratum, the logical network or the stratum that carries a common network service may also be referred to as a common network stratum, and the common network stratum may also be referred to as a normal IP/MPLS stratum (Normal IP/MPLS stratum). When a packet is forwarded in the common network stratum, a dynamic MPLS label is to be used for the forwarding, and the dynamic MPLS label is delivered by using the Label Distribution Protocol (LDP). 6 G, 8 G, and the like that are shown in FIG. 2c are bandwidths of sublinks that form the common network stratum. The network topology shown in FIG. 2c is also a subtopology of the network topology shown in FIG. 2a.

It can be seen from FIG. 2a, FIG. 2b, and FIG. 2c that, in this embodiment of the present disclosure, one physical network is allocated into two parallel logical networks or two parallel layers, where one layer is the hard pipe stratum to which statistical multiplexing is inapplicable, so that it can be achieved that an end-to-end bandwidth is ensured, and is used to carry a leased line service. The other layer is a normal common network stratum, and is used to carry a common service. The two layers share a same physical network, that is, share a link between routers in the physical network, but do not share a link bandwidth of the link. In this embodiment of the present disclosure, the network management system of the physical network specially reserves some MPLS labels for a service packet in the hard pipe stratum. APE router in the physical network can distinguish whether a received packet is a service packet of a leased line service or a common service packet, encapsulate an MPLS label in the static MPLS label set for a service packet that belongs to the leased line service, and forward the service packet by using the hard pipe stratum. That is, all service packets in the hard pipe stratum are MPLS encapsulated, and a service on one layer does not enter the other layer. The two layers coexist for the physical network or a router in the physical network. For the router in the physical network, a separate control layer and a separate forward layer that are for each layer exist, that is, a control layer and a forward layer that are for the hard pipe stratum exist, and a control layer and a forward layer that are for the common network stratum also exist. In the hard pipe stratum, statistical multiplexing is inapplicable, an end-to-end bandwidth is ensured, and forwarding of service packet is not delayed.

Based on the embodiment shown in FIG. 1, the following describes, by establishing an end-to-end leased line service, how the network management system uses the static MPLS label set to guide forwarding of the service packet of the leased line service.

Figure 3:
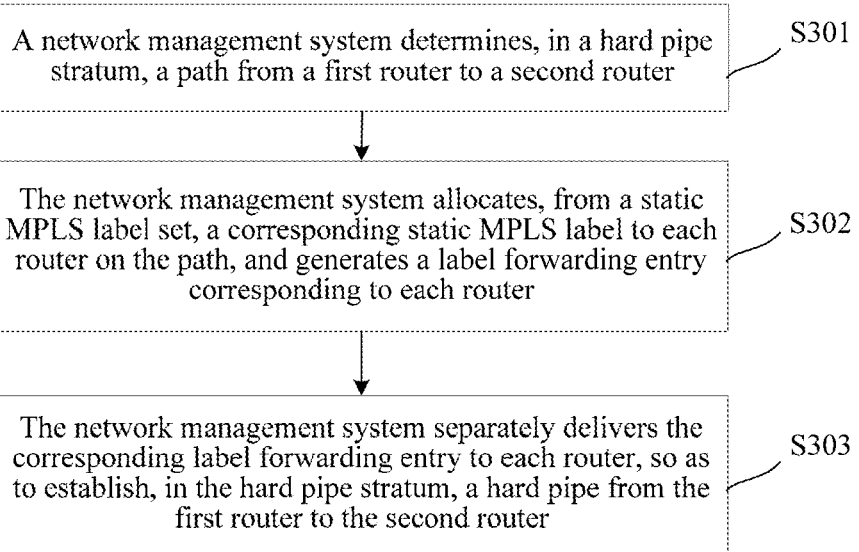
FIG. 3 is a flowchart of a method for establishing a hard pipe according to an embodiment of the present disclosure.

Optionally, when the network management system forwards, in the hard pipe stratum, the leased line service from a first router to a second router, the first router is a router in the hard pipe stratum, and the second router is a router in the hard pipe stratum. FIG. 3 is a flowchart of a method for establishing a hard pipe according to an embodiment of the present disclosure. As shown in FIG. 3, the method includes:

S301: The network management system determines, in the hard pipe stratum, a path from the first router to the second router.

It should be noted herein that, when a leased line service between the first router and the second router in the hard pipe stratum is to be established, generally, the network management system may determine at least one path from a network topology of the hard pipe stratum. However, it should be noted that, because a leased line service has a particular fixed leased line bandwidth, the network management system determines whether a remaining fixed bandwidth of each sublink on a path is greater than the fixed leased line bandwidth, and the network management system determines that the path is an effective path that satisfies the leased line service only when the remaining bandwidth of each sublink on a path is greater than the fixed leased line bandwidth of the leased line service.

That is, optionally, the fixed leased line bandwidth of the leased line service is less than or equal to a minimum value of a bandwidth of the sublink in the hard pipe. When a sublink in the hard pipe stratum carries multiple leased line services, a sum of fixed leased line bandwidths of the multiple leased line services is less than or equal to the bandwidth of the sublink.

S302: The network management system allocates, from the static MPLS label set, a corresponding static MPLS label to each router on the path, and generates a label forwarding entry corresponding to each router.

S303: The network management system delivers the corresponding label forwarding entry respectively to each router, so as to establish, in the hard pipe stratum, a hard pipe (full name in English: Hard pipe) from the first router to the second router, where the hard pipe is a Label Switched Path (LSP) or a pseudo wire (PW) in the hard pipe stratum.

It should be noted that an MPLS label, functioning as a pipe label (Pipe Label), in a label forwarding entry delivered to each router on the path does not carry a bandwidth attribute, that is, when the label forwarding entry is delivered, no bandwidth is to be reserved for the leased line service from the hard pipe stratum, and instead, only one packet forwarding path from the first router to the second router is established. Each router includes a router functioning as a PE router and a provider (Provider, P) router between PEs at two ends of the hard pipe. Reservation of a bandwidth for the leased line service is implemented by using a leased line label of a service packet of the leased line service. The leased line label only needs to be configured on PEs at two ends of the hard pipe. An end-to-end bandwidth is ensured for the hard pipe established for the leased line service, and the ensured bandwidth cannot be exceeded and cannot be occupied by another service. In this embodiment of the present disclosure, a hard pipe established in an IP/MPLS network can have a same function as a TDM leased line does.

Optionally, after S301 is performed, before S302, the network management system may further determine whether an MPLS tunnel that is proper from the first router to the second router has been established on the path, that is, whether a label forwarding entry has been delivered to all routers on the path. If the label forwarding entry has been delivered, the network management system may directly use the MPLS tunnel to establish a hard pipe.

When an established hard pipe is canceled, a fixed leased line bandwidth reserved on the sublink on the path is no longer reserved for the hard pipe, and instead may be reserved again for another leased line service.

Optionally, the sublink in the hard pipe stratum may further have a bandwidth extension function. For example, a leased line service from the first router to the second router needs to be established in the hard pipe stratum. However, remaining bandwidths of some sublinks on the path from the first router to the second router are less than the fixed leased line bandwidth of the leased line service, and the path is not an effective path. The network management system may extend the bandwidth of the sublink, so as to satisfy the fixed leased line bandwidth and establishing a hard pipe. If the sublink in the hard pipe stratum does not have a bandwidth extension function, a hard pipe cannot be established for the leased line service.

Information that needs to be saved by the network management system for the hard pipe stratum mainly includes: the network topology in the hard pipe stratum, a bandwidth and a remaining bandwidth that are of each sublink, the static MPLS label set, a leased line label of a leased line service, and a fixed leased line bandwidth of each leased line service.

Optionally, the leased line service is a VPN service, a VPN label corresponding to the VPN service is a static label allocated by the network management system, or a VPN label corresponding to the VPN service is dynamically allocated by using a dynamic protocol. When the VPN service is a Layer 3 Virtual Private Network (L3VPN) service, the dynamic protocol may be the Border Gateway Protocol (BGP). When the VPN service is a Layer 2 Virtual Private Network (L2VPN) service, the dynamic protocol may be the Label Distribution Protocol (LDP), and the L2VPN service may be a Virtual Private Local Area Network (LAN) Service (VPLS) or a Pseudo Wire Emulation Edge to Edge (PWE3) service.

The following describes establishing of a hard pipe in a hard pipe stratum in a manner of a schematic diagram of a network topology.

Figure 4:
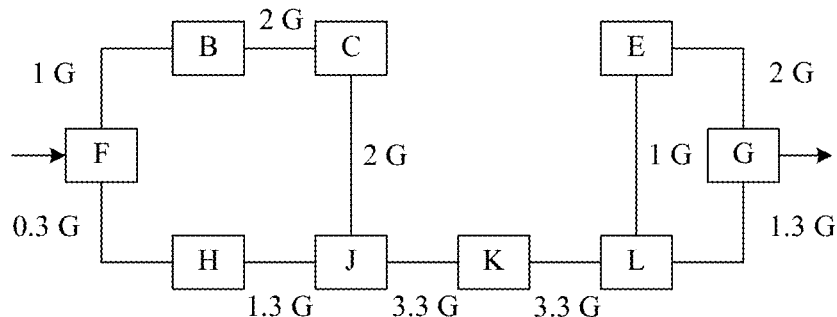
FIG. 4 is a schematic diagram of a network topology of a hard pipe stratum according to an embodiment of the present disclosure.

FIG. 4 is a schematic diagram of a network topology of a hard pipe stratum according to an embodiment of the present disclosure.

As shown in FIG. 4, a leased line service from a router F to a router G needs to be established. A fixed leased line bandwidth of the leased line service is 0.4 G. Generally, in the network topology, a network management system selects, between two nodes, a path for which a quantity of times of forwarding is the smallest. In FIG. 4, a path for which a quantity of times of forwarding is the smallest between the router F and the router G is a first path, and the path is: F→H→J→K→L→G. However, because a remaining bandwidth of a sublink between the router F and a router H is 0.3 G, which is less than the fixed leased line bandwidth of 0.4 G of the leased line service, the first a path is not an effective path. Therefore, the network management system reselects a path from F to G, for example, a second path: F→B→C→K→L→G. A remaining bandwidth of each sublink on the second path is greater than the fixed leased line bandwidth of 0.4 G. Therefore, the second path may be determined as an effective path, and the network management system establishes a hard pipe by using the second path. When the network management system determines that the hard pipe needs to be used to forward a service, the network management system generates a label forwarding entry corresponding to each router, delivers the label forwarding entry corresponding to each router to the corresponding router, that is, delivers the label forwarding entry to corresponding routers F, B, C, J, K, L, and G on the second path, and further establishes an MPLS tunnel from F to G, to carry the leased line service. The label forwarding entry includes a correspondence among an incoming label, an outgoing label, and an outbound interface. A router J and a router K on the second path are used as an example for description. A corresponding forwarding entry delivered to the router J includes a correspondence among an incoming label (that is, an outgoing label of a previous-hop router C of the router J), an outgoing label (that is, a label sent to the next-hop router K of the router J, also an incoming label of the router K), and an outbound interface (that is, an interface, which is connected to the router K, of the router J). A corresponding forwarding entry delivered to the router K includes a correspondence among an incoming label (that is, an outgoing label of the previous-hop router J of the router K), an outgoing label (that is, a label sent to a next-hop router L of the router K, also an incoming label of the router L), and an outbound interface (that is, an interface, which is connected to the next-hop router L, of the router K). The network management system updates a remaining bandwidth of each sublink on the second path, a quantity of hard pipes, and fixed leased line bandwidths of the hard pipes, and the like.

The following describes establishing of a hard pipe in a hard pipe stratum in a manner of a schematic diagram of bandwidth allocation. Based on the network topology of FIG. 1, a link between a router B and a router C is used as an example; referring to FIG. 4 A, FIG. 4 A is a schematic diagram of network bandwidth allocation according to an embodiment of the present disclosure. A fixed bandwidth of 2 G is allocated from a bandwidth of 10 G of the link between the router B and the router C to form a first sublink, and the first sublink, the router B, and the router C form a hard pipe stratum. A remaining bandwidth of 8 G of the link between the router B and the router C forms a second sublink, and the second sublink, the router B, and the router C form a common network stratum. Bandwidths of the hard pipe stratum and the common network stratum are separate from each other and are free of interference from each other. The hard pipe stratum may carry multiple hard pipes. As shown in FIG. 4A, the hard pipe stratum carries three hard pipes, that is, services of three leased lines (PW): a leased line 1, a leased line 2, and a leased line X. A sum of fixed leased line bandwidths of the leased line 1, the leased line 2, and the leased line X is less than or equal to the bandwidth of 2 G of the hard pipe stratum.

As can be seen from this, a network management system instructs a router in a network topology to allocate a fixed bandwidth on a link connected to the router, a sublink formed by a link to which the fixed bandwidth is allocated and the router that allocates the sublink form a hard pipe stratum of the network, and a static MPLS label set is allocated to the hard pipe stratum, so that only a service packet that has an MPLS label in the static MPLS label set is forwarded by using the hard pipe stratum. A label in the static MPLS label set is allocated to a service packet of only a leased line service, so that the hard pipe stratum carries only the leased line service, and forwards a service packet of only the leased line service, thereby ensuring that a bandwidth of the leased line service is not occupied by a non-leased line service, and providing a leased line service whose bandwidth is ensured.

Embodiment 2

Based on Embodiment 1 of the present disclosure, this embodiment of the present disclosure describes, from a side of a router in a network, how to forward a service packet of a leased line service. FIG. 5 is a flowchart of a method for forwarding a packet in a network according to an embodiment of the present disclosure. The network includes a first router, a second router, and a network management system. The method includes:

S501: The first router receives a label forwarding entry delivered by the network management system, where the label forwarding entry includes a static MPLS label, the label forwarding entry is used to establish a hard pipe from the first router to the second router, and the hard pipe is an LSP or a PW from the first router to the second router.

S502: The first router receives a service packet of a leased line service that is sent by a user, and encapsulates, before a header of the service packet, the static MPLS label and a leased line label that corresponds to the leased line service.

It should be noted that the static MPLS label is from a reserved static MPLS label set, and each static MPLS label in the static MPLS label set is used for only the leased line service, that is, when receiving a service packet of only the leased line service, the first router encapsulates the static MPLS label for the service packet.

A path selected for the hard pipe established from the first router to the second router is related to a size of a fixed leased line bandwidth of the leased line service, and the hard pipe has a fixed bandwidth, where the fixed bandwidth is greater than or equal to the fixed leased line bandwidth of the leased line service. For the hard pipe, path selection for the hard pipe, and allocation of the fixed bandwidth, refer to related descriptions in Embodiment 1, and details are not described herein again.

The static MPLS label encapsulated before the header of the service packet is an outer-layer label of the service packet, so that a next-hop router of the first router determines a corresponding forwarding entry and forwards, in the hard pipe, the corresponding forwarding entry. A leased line label that corresponds to the leased line service and that is encapsulated before the header of the service packet is an inner layer label of the service packet, where the inner layer label is used to distinguish a different leased line service.

S503: The first router sends, according to the forwarding entry, the service packet in which the static MPLS label and the leased line label are encapsulated to the second router by using the hard pipe.

That is, when receiving a service packet of only the leased line service, the first router performs MPLS encapsulation for the service packet, forwards the service packet by using the hard pipe, and all service packets forwarded in the hard pipe are MPLS encapsulated. However, the first router does not encapsulate the static MPLS label for a packet that is from another service, and forwards the packet by using a bandwidth outside the hard pipe. Therefore, a service packet from only the leased line service is forwarded in the hard pipe from the first router to the second router, and the hard pipe stratum carries only the leased line service and forwards a service packet of only the leased line service, thereby ensuring that a bandwidth of the leased line service is not occupied by a non-leased line service, and providing a leased line service whose bandwidth is ensured.

Optionally, the leased line service is a VPN service, the leased line label is a VPN label corresponding to the VPN service, and the VPN label is a static label allocated by the network management system, or the VPN label is dynamically allocated by using a dynamic protocol. When the VPN service is an L3VPN service, the dynamic protocol may be the BGP. When the VPN service is an L2VPN service, the dynamic protocol may be the LDP, and the L2VPN service may be a VPLS or a PWE3 service.

For forwarding, in the hard pipe, of the service packet, refer to related content described in the embodiment shown in FIG. 4 in Embodiment 1, and details are not described herein again.

It can be seen that, a service packet that does not belong to a leased line service is encapsulated by using a label outside the static MPLS label set, and is forwarded by using a bandwidth outside the hard pipe stratum in the network, so that the hard pipe stratum is used to forward a service packet of only the leased line service. The leased line service and a common service do not share a bandwidth, thereby separating a bandwidth of the leased line service from a bandwidth of the common service. Even if situations of congestion and packet loss occur in the common service during peak hours of network use, a service packet of the common service is not forwarded by using the hard pipe stratum, so that the bandwidth ensured for the leased line service is not occupied.

Embodiment 3

Figure 6:
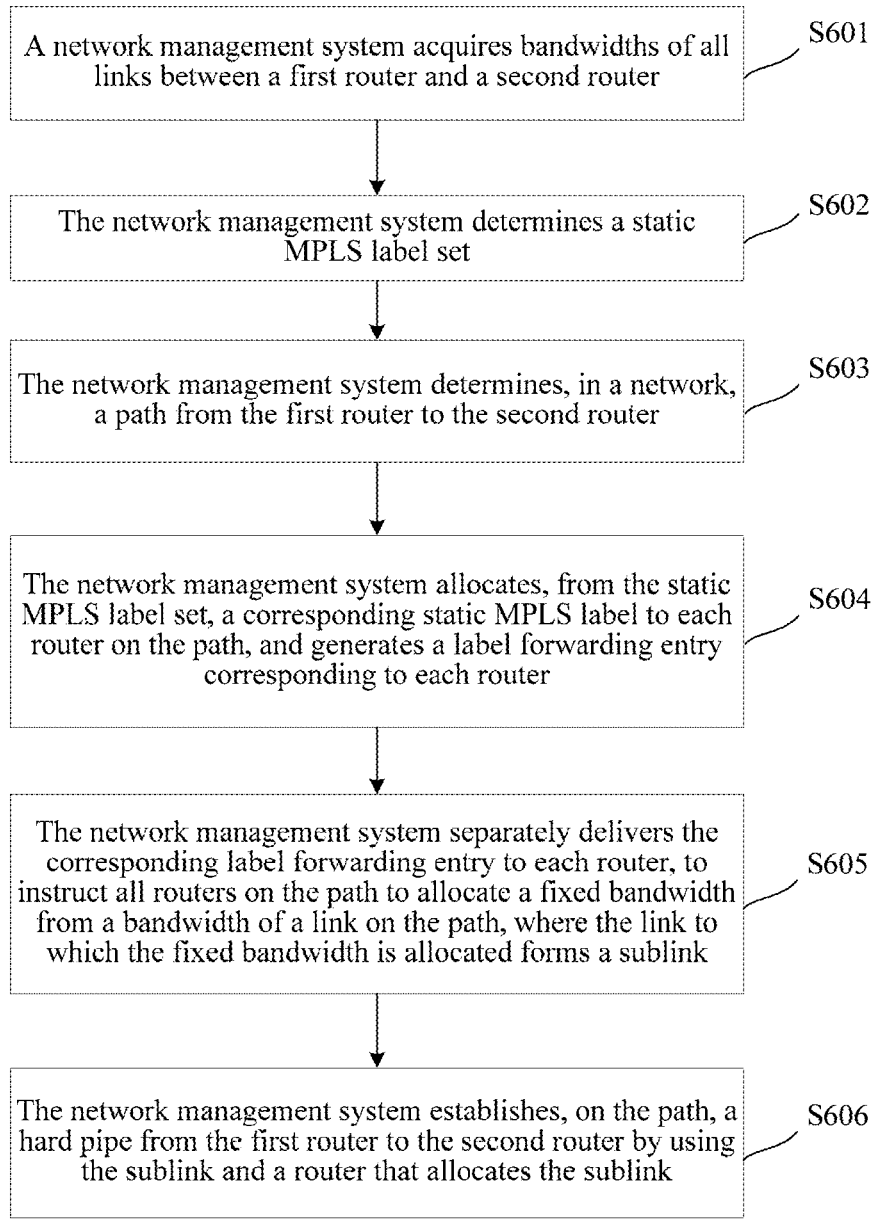
FIG. 6 is a flowchart of a method for establishing a hard pipe in a network according to an embodiment of the present disclosure.

Referring to FIG. 6, FIG. 6 is a flowchart of a method for establishing a hard pipe in a network according to an embodiment of the present disclosure. The network includes multiple routers and a network management system, and adjacent routers of the multiple routers are connected to each other by using a link that has a particular bandwidth. This embodiment describes, from a side of the network management system in the network, how to establish a hard pipe in the network.

As shown in FIG. 6, the method includes:

S601: The network management system acquires bandwidths of all links between a first router and a second router, where the first router is one router of the multiple routers, and the second router is one router of the multiple routers.

For this step, refer to the related description in S101 of the embodiment shown in FIG. 1 in Embodiment 1, and details are not described herein again.

S602: The network management system determines a static MPLS label set.

That is, an MPLS label in the static MPLS label set is specially used for the leased line service. Even if the network is a dynamic network, when a case such as a change in the network topology causes reallocation of an MPLS label, the MPLS label in the static MPLS label set does not change for this.

S603: The network management system determines, in the network, a path from the first router to the second router.

It should be noted herein that the multiple routers form a network topology by using the link, and the network management system determines a path from the first router to the second router by using the network topology, where generally, a path for which a quantity of times of forwarding is the smallest is determined.

S604: The network management system allocates, from the static MPLS label set, a corresponding static MPLS label to each router on the path, and generates a label forwarding entry corresponding to each router.

S605: The network management system delivers the corresponding label forwarding entry respectively to each router, to instruct all routers on the path to allocate a fixed bandwidth from a bandwidth of a link on the path, where the link to which the fixed bandwidth is allocated forms a sublink.

S606: The network management system establishes, on the path, a hard pipe from the first router to the second router by using the sublink and a router that allocates the sublink, where the hard pipe is an LSP or a PW in the network.

Optionally, the leased line service is a VPN service, a VPN label corresponding to the VPN service is a static label allocated by the network management system, or the VPN label is dynamically allocated by using a dynamic protocol. When the VPN service is an L3VPN service, the dynamic protocol may be the BGP. When the VPN service is an L2VPN service, the dynamic protocol may be the LDP, and the L2VPN service may be a VPLS or a PWE3 service.

It should be noted that an MPLS label, functioning as a pipe label (Tunnel Label), in a label forwarding entry delivered to each router on the path carries a bandwidth attribute. The network management system allocates, by delivering the label forwarding entry, a fixed bandwidth from bandwidths of all links on the path. It should also be noted that sizes of fixed bandwidths that are allocated from the bandwidths of all the links on the path are generally the same. For example, the path includes a router A, a router B, and a router C. Adjacent routers A and B are connected to each other, and a bandwidth of a link between the routers A and B is 10 G. Adjacent routers B and C are connected to each other, and a bandwidth of a link between the routers B and C is 10 G. A fixed service bandwidth of the leased line service is 0.5 G, a fixed bandwidth that is allocated from the bandwidth of the link between the routers A and B is 0.8 G, and a fixed bandwidth that is allocated from the bandwidth of the link between the routers B and C is also 0.8 G. For the routers A and B, the allocated fixed bandwidth of 0.8 G forms a sublink of the link between the routers A and B. For the routers B and C, the allocated fixed bandwidth of 0.8 G forms a sublink of the link between the routers B and C. The fixed bandwidth of 0.8 G is determined by using the MPLS label, and the fixed leased line bandwidth of 0.5 G is determined by using a leased line label that is encapsulated by using a service packet of the leased line service.

That is, optionally, a fixed leased line bandwidth of the leased line service is less than or equal to a bandwidth of the sublink in the hard pipe.

Information that needs to be saved by the network management system for the hard pipe mainly includes:

a label forwarding entry that is delivered for each router in the hard pipe, the network topology in the hard pipe, a fixed bandwidth of the hard pipe, a leased line label of a leased line service deployed in the hard pipe, and a fixed leased line bandwidth of each leased line service deployed in the hard pipe.

The following describes establishing of a hard pipe in a network in a manner of a schematic diagram of a network topology, and a leased line service is carried.

Figure 7:
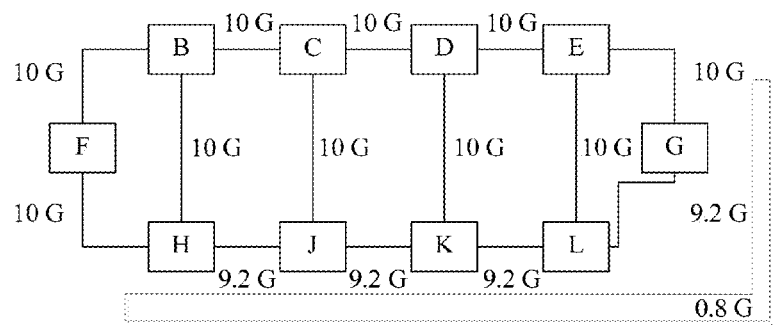
FIG. 7 is a schematic diagram of a network topology of a hard pipe according to an embodiment of the present disclosure.

FIG. 7 is a schematic diagram of a network topology of a hard pipe according to an embodiment of the present disclosure.

As shown in FIG. 7, a hard pipe from a router H to a router G needs to be established, and a fixed bandwidth of the hard pipe is 0.8 G. Generally, in the network topology, the network management system selects, between two nodes, a path for which a quantity of times of forwarding is the smallest. In FIG. 7, a path from the router H to the router G is: H→J→K→L→G. A label forwarding entry is generated from the static MPLS label set and is delivered, and a fixed bandwidth of 0.8 G is allocated from each link on the path from the router H to the router G to form the hard pipe. When a first leased line service from the router H to the router G needs to be deployed, a fixed leased line bandwidth of the first leased line service is 0.5 G, and a bandwidth of 0.5 G is reserved from the hard pipe by using a leased line label of a first service packet of the first leased line service. When a second leased line service from the router H to the router G further needs to be deployed by using the hard pipe, if a fixed leased line bandwidth of the second leased line service is 0.1 G, a bandwidth of 0.1 G is reserved from the hard pipe by using a leased line label of a second service packet of the second leased line service. After two leased line services are deployed in the hard pipe, a bandwidth of 0.2 G remains in the hard pipe. The label forwarding entry includes a correspondence among an incoming label, an outgoing label, and an outbound interface. A router J and a router K are used as an example. A corresponding forwarding entry delivered to the router J includes a correspondence among an incoming label (that is, an outgoing label of a previous-hop router C of the router J), an outgoing label (that is, a label sent to the next-hop router K of the router J, also an incoming label of the router K), and an outbound interface (that is, an interface, which is connected to the router K, of the router J). A corresponding forwarding entry delivered to the router K includes a correspondence among an incoming label (that is, an outgoing label of the previous-hop router J of the router K), an outgoing label (that is, a label sent to a next-hop router L of the router K, also an incoming label of the router L), and an outbound interface (that is, an interface, which is connected to the next-hop router L, of the router K). The network management system updates a remaining bandwidth of each sublink in the hard pipe, a quantity of hard pipes, and fixed leased line bandwidths of the hard pipes, and the like.

Figure 7A:
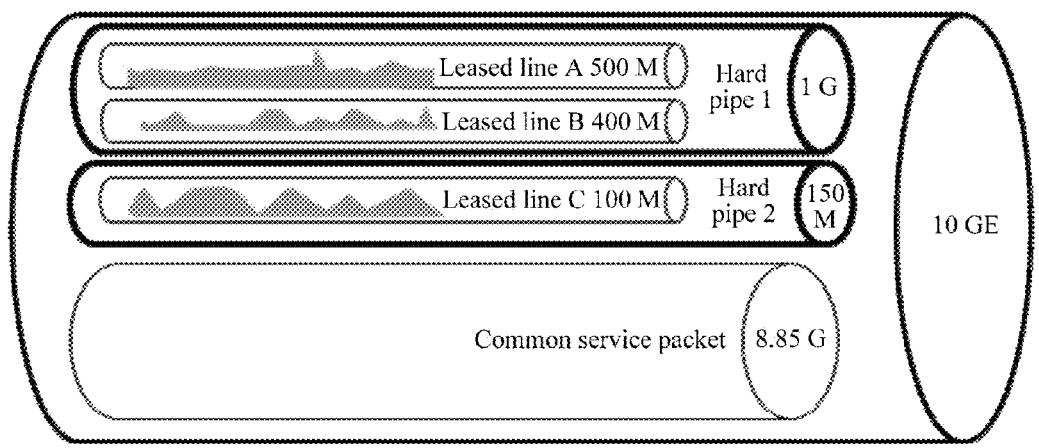
FIG. 7A is a schematic diagram of network bandwidth allocation according to an embodiment of the present disclosure.

The following describes establishing of a hard pipe in a network in a manner of a schematic diagram of bandwidth allocation, and a leased line service is carried. FIG. 7A is a schematic diagram of network bandwidth allocation according to an embodiment of the present disclosure. Based on the network topology of FIG. 7, it is assumed that two hard pipes: a hard pipe 1 and a hard pipe 2, are established on a link between the router J and the router K, and a fixed bandwidth of the hard pipe 1 is 1 G. The network management system deploys, by using the hard pipe 1, two leased line services: a leased line A and a leased line B. A fixed leased line bandwidth of the leased line A is 500 M, and a fixed leased line bandwidth of the leased line B is 400 M. After the leased line A and the leased line B are deployed, a bandwidth of 100 M remains in the hard pipe 1. A fixed bandwidth of the hard pipe 2 is 150 M, the network management system deploys, by using the hard pipe 2, a leased line service: a leased line C. A fixed leased line bandwidth of the leased line C is 100 M. It can be seen that, sums of the fixed leased line bandwidths of the leased line services deployed in the hard pipe 1 and the hard pipe 2 are less than the fixed bandwidths of the hard pipes. Theoretically, a sum of fixed leased line bandwidths of leased line services deployed in a hard pipe may at most equal to a fixed bandwidth of the hard pipe. In total, a fixed bandwidth of 1.15 G is allocated, from a bandwidth of the link between the router J and the router K, for the hard pipe 1 and the hard pipe 2, and remaining 8.85 G is used to forward a common service packet of a non-leased line service. The fixed bandwidths of the hard pipe 1 and the hard pipe 2 are separate from each other and are free of interference from each other. The fixed bandwidth of the hard pipe and the bandwidth that is used for forwarding a common service packet are also separate from each other and are free of interference from each other.

As can be seen from this, a fixed bandwidth is allocated from a bandwidth of each link on a determined path to form a sublink, and a hard pipe from the first router to the second router is established by using the sublink and the router that allocates the sublink. A fixed bandwidth in the hard pipe is used to forward only a leased line packet from the first router to the second router, thereby ensuring that a bandwidth of a leased line service is not occupied by a non-leased line service, and providing a leased line service whose bandwidth is ensured.

Embodiment 4

Figure 8:
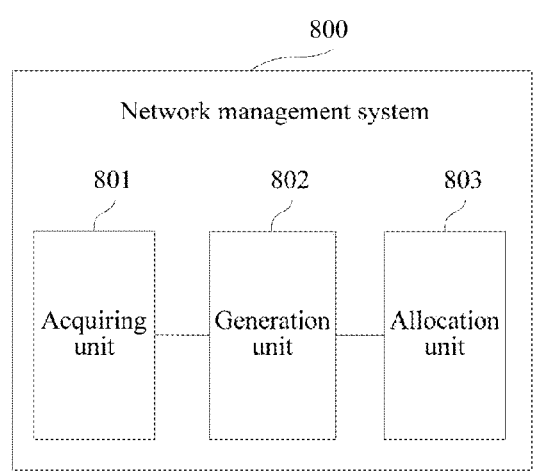
FIG. 8 is a schematic structural diagram of a network management system for establishing a hard pipe stratum in a network according to an embodiment of the present disclosure.

Referring to FIG. 8, FIG. 8 is a structural diagram of a network management system 800 according to an embodiment of the present disclosure. A network includes multiple routers and the network management system 800, adjacent routers of the multiple routers are connected to each other by using a link that has a particular bandwidth, the multiple routers form a network topology by using the link, the network management system 800 may be a network management system in Embodiment 1, and the network management system 800 includes an acquiring unit 801, a generation unit 802 and an allocation unit 803.

The acquiring unit 801, configured to acquire bandwidths of all links in the network;

Content related to performing by the acquiring unit 801 is similar to S101 of Embodiment 1 of the present disclosure, for which, refer to the related description in S101 of Embodiment 1, and details are not described herein again.

The generation unit 802, configured to instruct a router in the network topology to allocate a fixed bandwidth from a bandwidth of the link of the network topology, where a link to which the fixed bandwidth is allocated forms a sublink, and the sublink and the router that allocates the sublink form a hard pipe stratum, where the hard pipe stratum is a subtopology of the network topology, and the hard pipe stratum is used to carry a leased line service; and Content related to performing by the generation unit 802 is similar to S102 of Embodiment 1 of the present disclosure, for which, refer to the related description in S102 of Embodiment 1, and details are not described herein again.

The allocation unit 803, configured to allocate a static MPLS label set to the hard pipe stratum, where the static MPLS label set is used to forward, in the hard pipe stratum, the leased line service.

Content related to performing by the allocation unit 803 is similar to S103 of Embodiment 1 of the present disclosure, for which, refer to the related description in S103 of Embodiment 1, and details are not described herein again.

Figure 9:
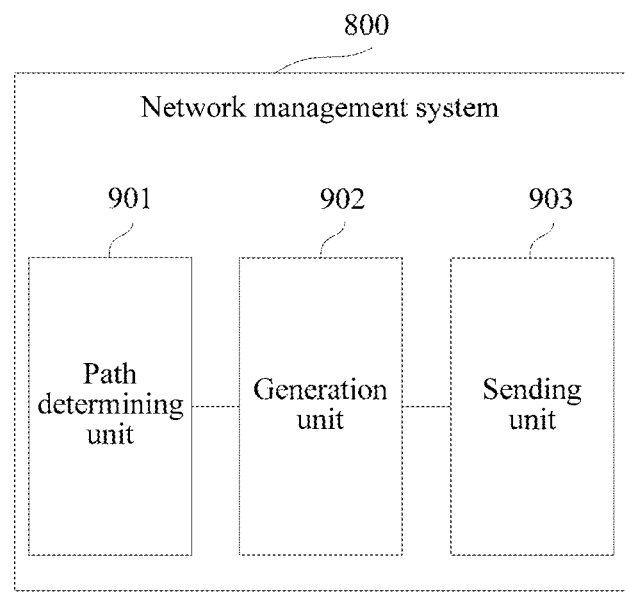
FIG. 9 is a schematic structural diagram of a network management system for establishing a hard pipe according to an embodiment of the present disclosure.

Based on the embodiment shown in FIG. 8, the following describes, by establishing an end-to-end leased line service, how the network management system 800 that establishes a hard pipe stratum uses the static MPLS label set to guide forwarding of a service packet of the leased line service. FIG. 9 is a structural diagram of a network management system for establishing a hard pipe according to an embodiment of the present disclosure.

Optionally, when the network management system forwards, in the hard pipe stratum, the leased line service from a first router to a second router, the first router is a router in the hard pipe stratum, and the second router is a router in the hard pipe stratum. As shown in FIG. 9, the network management system 800 that establishes the hard pipe stratum further includes a path determining unit 901, a generation unit 902 and a sending unit 903.

The path determining unit 901, configured to determine, in the hard pipe stratum, a path from the first router to the second router;

Content related to performing by the path determining unit 901 is similar to S301 of Embodiment 1 of the present disclosure, for which, refer to the related description in S301 of Embodiment 1, and details are not described herein again.

However, it should be noted that a leased line service has a particular fixed leased line bandwidth, and the path determining unit 901 determines whether a remaining fixed bandwidth of each sublink on a path is greater than the fixed leased line bandwidth. The path determining unit 901 determines that the path is an effective path that satisfies the leased line service only when the remaining bandwidth of each sublink on the path is greater than the fixed leased line bandwidth of the leased line service.

That is, optionally, the fixed leased line bandwidth of the leased line service is less than or equal to a minimum value of a bandwidth of the sublink in the hard pipe. When a sublink in the hard pipe stratum carries multiple leased line services, a sum of fixed leased line bandwidths of the multiple leased line services is less than or equal to the bandwidth of the sublink.

The generation unit 902, configured to allocate, from the static MPLS label set, a corresponding static MPLS label to each router on the path, and generate a label forwarding entry corresponding to each router; and Content related to performing by the generation unit 902 is similar to S302 of Embodiment 1 of the present disclosure, for which, refer to the related description in S302 of Embodiment 1, and details are not described herein again.

The sending unit 903, configured to separately deliver the corresponding label forwarding entry to each router, so as to establish, in the hard pipe stratum, a hard pipe from the first router to the second router, where the hard pipe is an LSP or a PW in the hard pipe stratum.

Optionally, the leased line service is a VPN service, a VPN label corresponding to the VPN service is a static label allocated by the network management system, or the VPN label is dynamically allocated by using a dynamic protocol. When the VPN service is an L3VPN service, the dynamic protocol may be the BGP. When the VPN service is an L2VPN service, the dynamic protocol may be the LDP, and the L2VPN service may be a VPLS or a PWE3 service.

Content related to performing by the sending unit 903 is similar to S303 of Embodiment 1 of the present disclosure, for which, refer to the related description in S303 of Embodiment 1, and details are not described herein again.

As can be seen from this, a network management system instructs a router in a network topology to allocate a fixed bandwidth on a link connected to the router, a sublink formed by a link to which the fixed bandwidth is allocated and the router that allocates the sublink form a hard pipe stratum of the network, and a static MPLS label set is allocated to the hard pipe stratum, so that only a service packet that has an MPLS label in the static MPLS label set is forwarded by using the hard pipe stratum. A label in the static MPLS label set is allocated to a service packet of only a leased line service, so that the hard pipe stratum carries only the leased line service, and forwards a service packet of only the leased line service, thereby ensuring that a bandwidth of the leased line service is not occupied by a non-leased line service, and providing a leased line service whose bandwidth is ensured.

Embodiment 5

Figure 10:
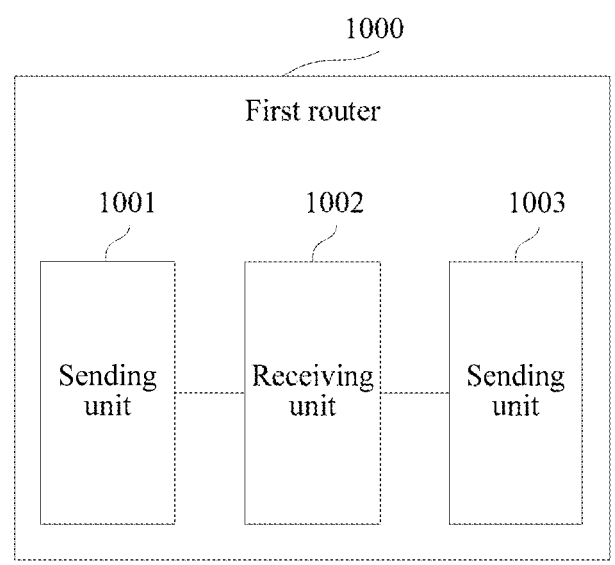
FIG. 10 is a schematic structural diagram of a first router for forwarding a packet in a network according to an embodiment of the present disclosure.

Referring to FIG. 10, FIG. 10 is a schematic structural diagram of a first router 1000 for forwarding a packet in a network according to an embodiment of the present disclosure. The network includes the first router 1000, a second router, and a network management system. The first router 1000 for forwarding a packet in a network includes a sending unit 1001, a receiving unit 1002 and a sending unit 1003.

The sending unit 1001, configured to receive a label forwarding entry delivered by the network management system, where the label forwarding entry includes a static multiprotocol label switching MPLS label, the label forwarding entry is used to establish a hard pipe from the first router to the second router, and the hard pipe is a label switched path LSP or a pseudo wire PW from the first router to the second router; and Content related to performing by the sending unit 1001 is similar to S501 of Embodiment 2 of the present disclosure, for which, refer to the related description in S501 of Embodiment 2, and details are not described herein again.

The receiving unit 1002, configured to receive a service packet of a leased line service that is sent by a user, and encapsulate, before a header of the service packet, the static MPLS label and a leased line label that corresponds to the leased line service; and Content related to performing by the receiving unit 1002 is similar to S502 of Embodiment 2 of the present disclosure, for which, refer to the related description in S502 of Embodiment 2, and details are not described herein again.

The sending unit 1003, configured to send, according to the forwarding entry, the service packet in which the static MPLS label and the leased line label are encapsulated to the second router by using the hard pipe.

Content related to performing by the sending unit 1003 is similar to S503 of Embodiment 2 of the present disclosure, for which, refer to the related description in S503 of Embodiment 2, and details are not described herein again.

Optionally, the leased line service is a VPN service, the leased line label is a VPN label corresponding to the VPN service, and the VPN label is a static label allocated by the network management system, or the VPN label is dynamically allocated by using a dynamic protocol. When the VPN service is an L3VPN service, the dynamic protocol may be the BGP. When the VPN service is an L2VPN service, the dynamic protocol may be the LDP, and the L2VPN service may be a VPLS or a PWE3 service.

It can be seen that, a service packet that does not belong to a leased line service is encapsulated by using a label outside the static MPLS label set, and is forwarded by using a bandwidth outside the hard pipe stratum in the network, so that the hard pipe stratum is used to forward a service packet of only the leased line service. The leased line service and a common service do not share a bandwidth, thereby separating a bandwidth of the leased line service from a bandwidth of the common service. Even if situations of congestion and packet loss occur in the common service during peak hours of network use, a service packet of the common service is not forwarded by using the hard pipe stratum, so that the bandwidth ensured for the leased line service is not occupied.

Embodiment 6

Figure 11:
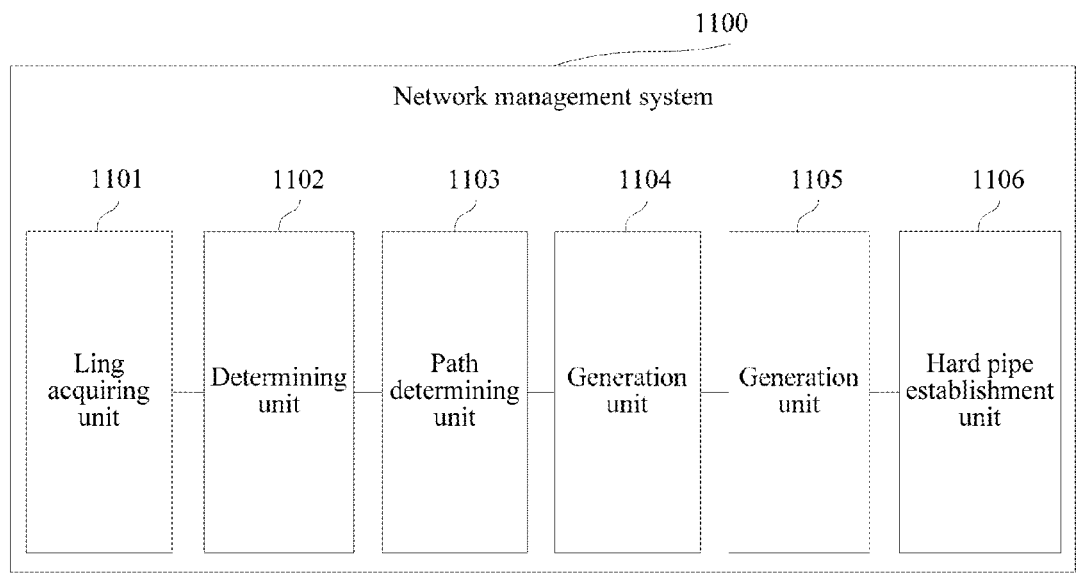
FIG. 11 is a schematic structural diagram of a first router for establishing a hard pipe in a network according to an embodiment of the present disclosure.

Referring to FIG. 11, FIG. 11 is a network management system 1100 for establishing a hard pipe in a network according to an embodiment of the present disclosure. The network includes multiple routers and the network management system 1100, adjacent routers of the multiple routers are connected to each other by using a link that has a particular bandwidth, and the network management system 1100 for establishing a hard pipe in a network includes a link acquiring unit 1101, a determining unit 1102, a path determining unit 1103, a generation unit 1104, a sending unit 1105, and a hard pipe establishing unit 1106:

The link acquiring unit 1101, configured to acquire bandwidths of all links between a first router and a second router, where the first router is one router of the multiple routers, and the second router is one router of the multiple routers;

Content related to performing by the link acquiring unit 1101 is similar to S601 of Embodiment 3 of the present disclosure, for which, refer to related description in S601 of Embodiment 3, and details are not described herein again.

The determining unit 1102, configured to determine a static multiprotocol label switching MPLS label set;

Content related to performing by the determining unit 1102 is similar to S602 of Embodiment 3 of the present disclosure, for which, refer to related description in S602 of Embodiment 3, and details are not described herein again.

The path determining unit 1103, configured to determine, in the network, a path from the first router to the second router;

Content related to performing by the path determining unit 1103 is similar to S603 of Embodiment 3 of the present disclosure, for which, refer to related description in S603 of Embodiment 3, and details are not described herein again.

The generation unit 1104, configured to allocate, from the static MPLS label set, a corresponding static MPLS label to each router on the path, and generate a label forwarding entry corresponding to each router;

Content related to performing by the generation unit 1104 is similar to S604 of Embodiment 3 of the present disclosure, for which, refer to related description in S604 of Embodiment 3, and details are not described herein again.

The sending unit 1105, configured to separately deliver the corresponding label forwarding entry to each router, to instruct all routers on the path to allocate a fixed bandwidth from a bandwidth of a link on the path, where the link to which the fixed bandwidth is allocated forms a sublink; and Content related to performing by the sending unit 1105 is similar to S605 of Embodiment 3 of the present disclosure, for which, refer to related description in S605 of Embodiment 3, and details are not described herein again.

The hard pipe establishing unit 1106, configured to establish, on the path, a hard pipe from the first router to the second router by using the sublink and the router that allocates the sublink, where the hard pipe is a label switched path LSP or a pseudo wire PW in the network.

Content related to performing by the hard pipe establishing unit 1106 is similar to S606 of Embodiment 3 of the present disclosure, for which, refer to related description in S606 of Embodiment 3, and details are not described herein again.

Optionally, a fixed leased line bandwidth of the leased line service is less than or equal to a bandwidth of the sublink in the hard pipe.

Optionally, the leased line service is a VPN service, a VPN label corresponding to the VPN service is a static label allocated by the network management system, or the VPN label is dynamically allocated by using a dynamic protocol. When the VPN service is an L3VPN service, the dynamic protocol may be the BGP. When the VPN service is an L2VPN service, the dynamic protocol may be the LDP, and the L2VPN service may be a VPLS or a PWE3 service.

As can be seen from this, a fixed bandwidth is allocated from a bandwidth of each link on a determined connection to form a sublink, and a hard pipe from the first router to the second router is established by using the sublink and the router that allocates the sublink. A fixed bandwidth in the hard pipe is used to forward only a leased line packet from the first router to the second router, thereby ensuring that a bandwidth of a leased line service is not occupied by a non-leased line service, and providing a leased line service whose bandwidth is ensured.

Embodiment 7

Figure 12:
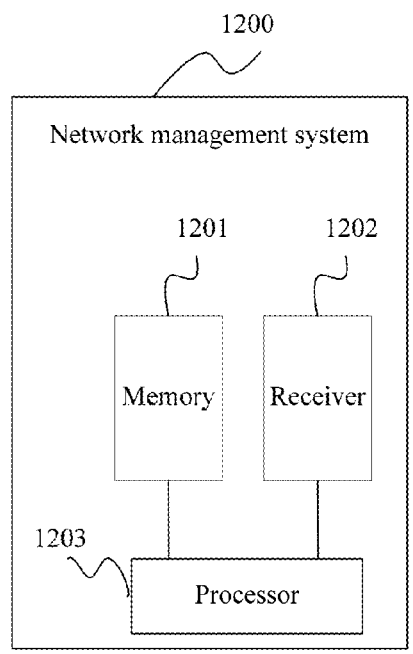
FIG. 12 is a schematic structural diagram of hardware of a network management system according to an embodiment of the present disclosure.

Referring to FIG. 12, FIG. 12 is a schematic structural diagram of hardware of a network management system according to an embodiment of the present disclosure. The network management system is located in a network, the network further includes multiple routers, adjacent routers of the multiple routers are connected to each other by using a link that has a particular bandwidth, and the multiple routers form a network topology by using the link. The network management system 1200 includes a memory 1201, a receiver 1202, and a processor 1203 that is separately connected to the memory 1201 and the receiver 1202. The memory 1201 is configured to store a set of program instructions, and the processor 1203 is configured to invoke the program instructions stored in the memory 1201 to perform the following operations:

triggering the receiver 1402 to acquire bandwidths of all links in the network;

instructing a router in the network topology to allocate a fixed bandwidth from a bandwidth of the link of the network topology, where a link to which the fixed bandwidth is allocated forms a sublink, and the sublink and the router that allocates the sublink form a hard pipe stratum, where the hard pipe stratum is a subtopology of the network topology, and the hard pipe stratum is used to carry a leased line service; and allocating a static multiprotocol label switching MPLS label set to the hard pipe stratum, where the static MPLS label set is used to forward, in the hard pipe stratum, the leased line service.

Optionally, the leased line service is a VPN service, a VPN label corresponding to the VPN service is a static label allocated by the network management system, or the VPN label is dynamically allocated by using a dynamic protocol. When the VPN service is an L3VPN service, the dynamic protocol may be the BGP. When the VPN service is an L2VPN service, the dynamic protocol may be the LDP, and the L2VPN service may be a VPLS or a PWE3 service.

Optionally, the processor 1203 may be a Central Processing Unit (CPU), the memory 1201 may be an internal memory of a Random Access Memory (RAM) type, and the receiver 1202 may include a common physical interface, where the physical interface may be an Ethernet (Ethernet) interface or an Asynchronous Transfer Mode (ATM) interface. The processor 1203, the receiver 1202, and the memory 1201 may be integrated into one or more independent circuits or hardware, for example, an Application-Specific Integrated Circuit (ASIC).

Embodiment 8

Figure 13:
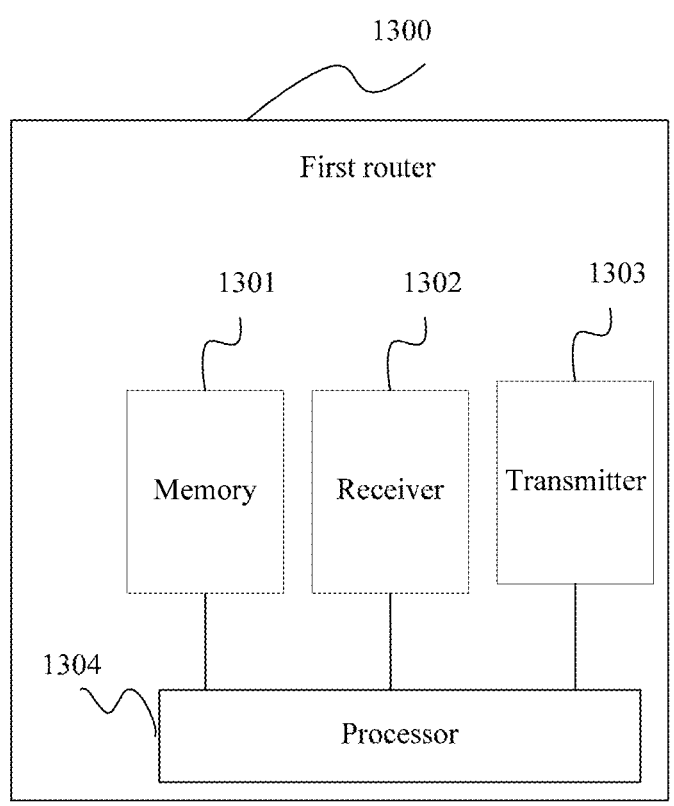
FIG. 13 is a schematic structural diagram of hardware of a router according to an embodiment of the present disclosure.

Referring to FIG. 13, FIG. 13 is a schematic structural diagram of hardware of a first router according to an embodiment of the present disclosure. The first router is located in a network, the network further includes a second router and a network management system, and the first router 1300 includes a memory 1301, a receiver 1302, a transmitter 1303, and a processor 1304 that is separately connected to the memory 1301, the receiver 1302, and the transmitter 1303. The memory 1301 is configured to store a set of program instructions. The processor 1304 is configured to invoke the program instructions stored in the memory 1301 to perform the following operations:

triggering the receiver 1302 to receive a label forwarding entry delivered by the network management system, where the label forwarding entry includes a static multiprotocol label switching MPLS label, the label forwarding entry is used to establish a hard pipe from the first router to the second router, and the hard pipe is a label switched path LSP or a pseudo wire PW from the first router to the second router;

triggering the receiver 1302 to receive a service packet of a leased line service that is sent by a user, and to encapsulate, before a header of the service packet, the static MPLS label and a leased line label that corresponds to the leased line service; and triggering the transmitter 1303 to send, according to the forwarding entry, the service packet in which the static MPLS label and the leased line label are encapsulated to the second router by using the hard pipe.

Optionally, the leased line service is a VPN service, the leased line label is a VPN label corresponding to the VPN service, and the VPN label is a static label allocated by the network management system, or the VPN label is dynamically allocated by using a dynamic protocol. When the VPN service is an L3VPN service, the dynamic protocol may be the BGP. When the VPN service is an L2VPN service, the dynamic protocol may be the LDP, and the L2VPN service may be a VPLS or a PWE3 service.

Optionally, the processor 1304 may be a CPU, the memory 1301 may be an internal memory of a RAM type, the receiver 1302 and the transmitter 1303 may include a common physical interface, and the physical interface may be an Ethernet (Ethernet) interface or an ATM interface. The processor 1304, the transmitter 1303, the receiver 1302, and the memory 1301 may be integrated into one or more independent circuits or one or more pieces of hardware, for example, an ASIC.

"First" of the first router mentioned in the embodiments of the present disclosure is used as only a name identifier, and does not represent the first place in order. The rule is also applicable to "second".

It should be noted that a person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a Read-Only Memory (ROM), or a RAM.

The method for establishing a hard pipe in a network, and the method and the apparatus for forwarding a packet in a network that are provided in the present disclosure are described in detail above. The principle and implementation manners of the present disclosure are described herein by using specific embodiments. The descriptions about the embodiments of the present disclosure are used only to help understand the method and core ideas of the present disclosure. In addition, a person of ordinary skill in the art can make modifications to the specific implementation manners and application scopes according to the ideas of the present disclosure. Therefore, the content of this specification shall not be construed as a limit to the present disclosure.

What is claimed is:

1. A method for establishing a hard pipe stratum in a network, wherein the network comprises multiple routers and a network management system, adjacent routers of the multiple routers are connected to each other by using a link that has a particular bandwidth, the multiple routers form a network topology by using the link, and the method comprises:

acquiring, by the network management system, bandwidths of a plurality of links in the network;

instructing, by the network management system, a router in the network topology to allocate a fixed bandwidth from a bandwidth of the link of the network topology, wherein a link to which the fixed bandwidth is allocated forms a sublink, and the sublink and the router that allocates the sublink form a hard pipe stratum, wherein the hard pipe stratum is a subtopology of the network topology, and the hard pipe stratum is used to carry a leased line service; and allocating, by the network management system, a static Multiprotocol Label Switching (MPLS) label set to the hard pipe stratum, wherein the static MPLS label set is used to forward, in the hard pipe stratum, the leased line service;

wherein the leased line service is a Virtual Private Network (VPN) service, and a VPN label corresponding to the VPN service is at least one of a static label allocated by the network management system or a dynamic label that is dynamically allocated by using a dynamic protocol.

2. The method according to claim 1, wherein when the network management system forwards, in the hard pipe stratum, the leased line service from a first router to a second router, the first router is a router in the hard pipe stratum, the second router is a router in the hard pipe stratum, and the method comprises:

determining, by the network management system, in the hard pipe stratum, a path from the first router to the second router;

allocating, by the network management system, from the static MPLS label set, a corresponding static MPLS label to each router on the path, and generating a label forwarding entry corresponding to each router; and separately delivering, by the network management system, the corresponding label forwarding entry to each router to establish, in the hard pipe stratum, a hard pipe from the first router to the second router, wherein the hard pipe is a label switched path (LSP) or a pseudo wire (PW) in the hard pipe stratum.

3. The method according to claim 2, wherein
a fixed leased line bandwidth of the leased line service is less than or equal to a minimum value of a bandwidth of the sublink in the hard pipe.

4. A network management system for establishing a hard pipe stratum in a network, wherein the network comprises multiple routers and the network management system, adjacent routers of the multiple routers are connected to each other by using a link that has a particular bandwidth, the multiple routers form a network topology by using the link, and the network management system comprises:

at least one hardware processor;

a non-transitory computer-readable storage medium coupled to the at least one hardware processor and storing programming instructions for execution by the at least one hardware processor, wherein the programming instructions instruct the at least one hardware processor to:

acquire bandwidths of a plurality of links in the network;

instruct a router in the network topology to allocate a fixed bandwidth from a bandwidth of the link of the network topology, wherein a link to which the fixed bandwidth is allocated forms a sublink, and the sublink and the router that allocates the sublink form a hard pipe stratum, wherein the hard pipe stratum is a subtopology of the network topology, and the hard pipe stratum is used to carry a leased line service; and allocate a static multiprotocol label switching MPLS label set to the hard pipe stratum, wherein the static MPLS label set is used to forward, in the hard pipe stratum, the leased line service;

wherein the leased line service is a virtual private network VPN service, and a VPN label corresponding to the VPN service is at least one of a static label allocated by the network management system or a dynamic label that is dynamically allocated by using a dynamic protocol.

5. The network management system according to claim 4, wherein when the network management system forwards, in the hard pipe stratum, the leased line service from a first router to a second router, the first router is a router in the hard pipe stratum, the second router is a router in the hard pipe stratum, and the programming instructions further instruct the at least one hardware processor to:

determine, in the hard pipe stratum, a path from the first router to the second router;

allocate, from the static MPLS label set, a corresponding static MPLS label to each router on the path, and generate a label forwarding entry corresponding to each router; and separately deliver the corresponding label forwarding entry to each router, to establish, in the hard pipe stratum, a hard pipe from the first router to the second router, wherein the hard pipe is a label switched path (LSP) or a pseudo wire (PW) in the hard pipe stratum.

6. The network management system according to claim 5, wherein
a fixed leased line bandwidth of the leased line service is less than or equal to a minimum value of a bandwidth of the sublink in the hard pipe.

7. A method for forwarding a packet in a network, wherein the network comprises a first router, a second router, and a network management system, and the method comprises:

receiving, by the first router, a label forwarding entry delivered by the network management system, wherein the label forwarding entry comprises a static Multiprotocol Label switching (MPLS) label, the label forwarding entry is used to establish a hard pipe from the first router to the second router, and the hard pipe is a label switched path (LSP) or a pseudo wire (PW) from the first router to the second router;

receiving, by the first router, a service packet of a leased line service that is sent by a user;

encapsulating, before a header of the service packet, the static MPLS label and a leased line label that corresponds to the leased line service; and sending, by the first router according to the label forwarding entry, the service packet in which the static MPLS label and the leased line label are encapsulated to the second router by using the hard pipe;

wherein the leased line service is a Virtual Private Network (VPN) service, the leased line label is a VPN label corresponding to the VPN service, and the VPN label is at least one of a static label allocated by the network management system or a dynamic label that is dynamically allocated by using a dynamic protocol.

8. A first router for forwarding a packet in a network, wherein the network comprises the first router, a second router, and a network management system, wherein the first router comprises:

at least one hardware processor;

a non-transitory computer-readable storage medium coupled to the at least one hardware processor and storing programming instructions for execution by the at least one hardware processor, wherein the programming instructions instruct the at least one hardware processor to:

receive a label forwarding entry delivered by the network management system, wherein the label forwarding entry comprises a static Multiprotocol Label Switching (MPLS) label, the label forwarding entry is used to establish a hard pipe from the first router to the second router, and the hard pipe is a label switched path (LSP) or a pseudo wire (PW) from the first router to the second router;

receive a service packet of a leased line service that is sent by a user;

encapsulate, before a header of the service packet, the static MPLS label and a leased line label that corresponds to the leased line service; and send, according to the forwarding entry, the service packet in which the static MPLS label and the leased line label are encapsulated to the second router by using the hard pipe;

wherein the leased line service is a virtual private network VPN service, the leased line label is a VPN label corresponding to the VPN service, and the VPN label is at least one of a static label allocated by the network management system or a dynamic label that is dynamically allocated by using a dynamic protocol.

9. A method for establishing a hard pipe in a network, wherein the network comprises multiple routers and a network management system, adjacent routers of the multiple routers are connected to each other by using a link that has a particular bandwidth, and the method comprises:

acquiring, by the network management system, bandwidths of one or more links between a first router and a second router, wherein the first router is one router of the multiple routers, and the second router is one router of the multiple routers;

determining, by the network management system, a static multiprotocol label switching MPLS label set;

determining, by the network management system, in the network, a path from the first router to the second router;

allocating, by the network management system, from the static MPLS label set, a corresponding static MPLS label to each router on the path, and generating a label forwarding entry corresponding to each router;

separately delivering, by the network management system, the corresponding label forwarding entry to each router, to instruct all routers on the path to allocate a fixed bandwidth from a bandwidth of a link on the path, wherein the link to which the fixed bandwidth is allocated forms a sublink; and establishing, by the network management system, on the path, a hard pipe from the first router to the second router by using the sublink and the router that allocates the sublink, wherein the hard pipe is a Label Switched Path (LSP) or a pseudo wire (PW) in the network, wherein the hard pipe is a subtopology of a network topology, and the hard pipe is used to carry a leased line service;

wherein the leased line service is a virtual private network VPN service, and a VPN label corresponding to the VPN service is at least one of a static label allocated by the network management system or a dynamic label that is dynamically allocated by using a dynamic protocol.

10. The method according to claim 9, wherein a fixed leased line bandwidth of a leased line service carried by the hard pipe is less than or equal to a bandwidth of the sublink in the hard pipe.

* * * * *